United States Patent [19]
Fairweather et al.

[11] Patent Number: 5,649,324
[45] Date of Patent: Jul. 15, 1997

[54] PLANT AND PROCESS FOR INCINERATING EXPLOSIVES

[75] Inventors: John Anthony Fairweather, Nussdorf, Austria; Walter Schulze, Holzminden, Germany; Markus Laffer, Wimmis, Switzerland

[73] Assignee: Bowas-induplan chemie ges. m.b.h, Salzburg, Austria

[21] Appl. No.: 157,078
[22] PCT Filed: Jun. 23, 1992
[86] PCT No.: PCT/EP92/01415
 § 371 Date: Dec. 13, 1993
 § 102(e) Date: Dec. 13, 1993
[87] PCT Pub. No.: WO93/00557
 PCT Pub. Date: Jan. 7, 1993

[30] Foreign Application Priority Data

Jun. 26, 1991 [DE] Germany .................. 41 21 133.2

[51] Int. Cl.$^6$ ........................................ A62D 3/00
[52] U.S. Cl. ................... 588/202; 110/237; 110/345
[58] Field of Search .................. 588/202; 110/237, 110/345

[56] References Cited

U.S. PATENT DOCUMENTS

| | | | |
|---|---|---|---|
| 3,916,805 | 11/1975 | Kalfadelis et al. | 110/7 R |
| 5,159,885 | 11/1992 | Hasebe et al. | 110/346 |
| 5,207,176 | 5/1993 | Morhard et al. | 110/246 |
| 5,249,952 | 10/1993 | West et al. | 431/5 |
| 5,339,754 | 8/1994 | Lyon | 110/345 |

Primary Examiner—Ngoclan Mai
Attorney, Agent, or Firm—Bell, Seltzer, Park & Gibson, P.A.

[57] ABSTRACT

The description relates to a plant and process for incinerating explosives. In the process, the explosives are burned in a incineration reactor (1) in which the gaseous reaction products (flue gases) thus produced are mixed with fresh or make-up air (5), cooled by this mixing process and then discharged from the incineration reactor (1). In order to improve the thermo-energetic efficiency of the above process, the gas mixture (2) discharged from the incineration reactor is taken to the combustion chamber (3) of a fuel (4) burning plant (11). To this end, the plant for incinerating explosives of the invention comprises an incineration reactor (1) in which the explosives (13) are burned with the generation of flue gas which, as described above, is mixed with fresh or make-up air (5) and then discharged from the incineration reactor (1) via gas pipes. In order to make use of the considerable thermal energy for the gas mixture (2) discharged from the incineration reactor (1), the latter is connected via its exhaust gas pipes to a fuel (4) burning plant (11).

19 Claims, 1 Drawing Sheet

PLANT AND PROCESS FOR INCINERATING EXPLOSIVES

BACKGROUND OF THE INVENTION

The invention relates to a method of deflagrating explosives, wherein the explosives are burnt up in a deflagration reactor and the flue gases resulting during deflagration are mixed with fresh air fed into the deflagration reactor, thereby being cooled, and then are discharged from the deflagration reactor.

The invention also relates to an installation for the deflagration of explosives, comprising a deflagration reactor in which the explosives are burnt up, the flue gases resulting during deflagration are mixed with fresh air fed into the deflagration reactor, thereby being cooled, and then are discharged from the deflagration reactor through exhaust gas pipes.

Methods as well as installations of that kind are known. They serve for the disposal of articles containing substances which are liable to explode or explodable, such as ammunition, rockets, pyrotechnic sets, and the like, especially from the military field. The reasons for disposal either are that the articles mentioned have reached a certain age from which on the defined characteristics assured upon manufacture of the substances which are liable to explode or explodable and required for their use can no longer be guaranteed or because, for example, weapons systems have been developed further and the ammunition already produced and on stock for those weapons systems can no longer be applied for their destined use. However, also the disposal of the so-called residual contamination or legacy has gained in importance particularly most recently with the generally grown consciousness of the existence of environmental problems. Whereas until some forty years ago the ammunition unused or captured during a war, for instance, was either buried in the ground or dumped at sea there is an awareness now, at least in the industrialized world, of the long-term damage done to the environment by such measures.

The substances liable to explode or explodable mentioned above will be designated hereinafter by the term "explosives". That is generally understood to be solid, liquid, or gelatinous substances and mixtures of substances produced for purposes of detonating or propelling. However, in the instant case also substances which have not been made for the purpose of detonation or shooting also are combined under the term of explosives, such as organic peroxides as catalysts, gas release agents of present day foam and plastics engineering, some pesticides, and many others. Likewise included, for instance, is the well known mixture "thermite" which is understood as being mixtures of aluminum and iron oxide which react while developing a large amount of heat, forming aluminum oxide and iron. This development of heat is utilized for example for welding rails.

Explosives can be available as bulk material of any particle size, as adhesions, in the form of bodies having defined dimensions (e.g. pressed objects), or as a filler in hollow bodies. The list given by Rudolf Meyer in "Explosivstoffe", 6th edition, page 127 et seqq. may serve as an indication of the groups of substances to be understood by the term "explosives".

The disposal of explosives is realized worldwide by the so-called deflagration or detonation of these substances due to the lack of safety involved in their handling, both for the persons and the surrounding material. It is called "deflagration" because practically all explosives which are present in larger amounts continue to react upon initiation of the chemical decomposition reactions without the addition of another reactant, especially without the atmospheric oxygen which otherwise is customary in "combustion".

While the deflagration of explosives up to the present time predominantly still is carried out in the open, with assurance of the necessary personal safety but without any regard for the reduction of emissions of the gaseous reaction products resulting from the deflagration, most recently semi-closed or closed installations and methods connected with them have become known for the deflagration of explosives, including the pickup of gaseous reaction products which result during deflagration (exhaust gases) and which are supplied, for example, to an installation for the reduction of harmful components in order to comply with the legal requirements for keeping clean the air, in particular with the 4th and 17th Federal Immission Protective Orders (4th and 17th BImSchV).

In order for the exhaust gases released upon deflagration of the explosives to be suitable for being fed to the harmful substance reducing plant, they must be cooled from the process temperature which may be several thousand degrees Celsius to a temperature of, for example, 300° C. so as to protect the downstream equipment. This cooling of the flue gases (exhaust gases) resulting from deflagration takes place by mixing those exhaust gases by means of fresh air fed into the deflagration reactor. The gas mixture to be discharged from the deflagration reactor consequently consists of the gaseous reaction products (flue gases or also exhaust gases) formed in the reactor during the deflagration of the explosives and the fresh air introduced into the deflagration reactor. This gas mixture, in general, first is passed through scrubbing stages in order to wash out acid and alkaline solid constituents. At this time the gas mixture is cooled to a temperature which is clearly below 100° C.

These known methods and installations for the deflagration of explosives have the disadvantage that the thermal energy efficiency is relatively low. The scrubbing stages just mentioned of the installation for reducing harmful substances do not substantially reduce non-oxidized organic components, such as carbon monoxide and nitrogen oxide proportions so that the gas mixture having passed the scrubbing stages must be heated again with high energy consumption so as to eliminate the harmful components still contained in the gas mixture in a thermal, catalytic or non-catalytic process. In addition, the known methods or installations of the kind mentioned initially provides poor conditions for recuperation of the thermal energy due to the relatively low temperature of the gas mixture leaving the harmful substance reducing plant of the deflagration reactor.

Furthermore, as regards the energy balance which is a starting point of the instant invention in the deflagration of explosives those known methods must be mentioned wherein a so-called slurry is formed of the explosives which are being mixed with water, i.e. a slurry of explosives in water, which is introduced in metered quantities for the purpose of deflagration into the combustion chamber, for example, of an incinerator plant.

The disadvantage of this known method likewise resides in poor energy efficiency. In general, up to 90% of the slurry consist of water which must be evaporated in the combustion chamber of the incinerator plant, with the addition of corresponding amounts of fuel.

Finally it is also known that, when reacting explosives which contain metal, high-temperature resistant inorganic compounds are formed in the slags and they react with water once they have cooled down. The slag, therefore, must be processed chemically so that residual material suitable for dumping can be obtained. All the slags consequently must pass the process of chemical treatment to provide waste material suitable for dumps if the explosives become mixed with other products—as often cannot be avoided—during deflagration in an incinerator plant.

The disadvantages of all the known methods and installations mentioned above for the deflagration of explosives may be summed up by stating that either the deflagration of the explosives themselves (slurry) or the reduction of harmful components subsequent to the deflagration require great energy expenditure and, what is more, recuperation of the thermal energy is not possible or only insufficiently so due to the rather low temperatures of the gas mixture upon purification.

Thus the problem underlying the instant invention resided in improving the thermal energy efficiency of a method of deflagrating explosives of the kind mentioned initially or of an installation for the deflagration of explosives of the kind mentioned initially.

SUMMARY OF THE INVENTION

In the case of a method of the kind mentioned initially, the solution according to the invention of that problem provides for the gas mixture discharged from the deflagration reactor to be supplied to the combustion chamber of a furnace for the combustion of fuels.

The technical problem underlying the instant invention furthermore is solved by an installation for the deflagration of explosives of the kind mentioned initially, wherein the deflagration reactor is connected by its exhaust gas pipes to a furnace for the combustion of fuels.

The advantages of the invention especially reside in that a method is obtainable which can be realized easily and yet is very effective to minimize the energy which must be spent for disposing of explosives by deflagration and subsequent reduction of harmful components and to maximize the utilization and recuperation of the high thermal energy resulting from the deflagration of the explosives and thus, in summary, to optimize the overall process in respect of the thermal energy efficiency. The method according to the invention makes it possible to burn up explosives with optimum utilization of the process heat, as well as to incinerate combustible waste or other fuels, exploiting the thermal energy generated during deflagration, and at the same time to fulfill in examplary fashion the requirements of keeping clean the air. The installation for the deflagration of explosives according to the invention likewise achieves those advantages.

According to the invention the gas mixture discharged from the deflagration reactor and still containing some 16 to 18 percent by volume of oxygen due to the fresh air introduced is supplied as an oxygen carrier of conventional combustion as the burner gas, i.e. partly or totally in the place of the air which is needed for combustion. In this context the designation "combustion" is to be understood as any kind of burning of fuels for the most diverse purposes, for example for the generation of heat in a power plant, for waste incineration in a waste incinerator plant, or also for the generation of heat in cement works. The efficiency of this combustion which takes place in a combustion chamber is increased considerably in that the thermal energy released upon deflagration of the explosives in the deflagration reactor is utilized for this combustion.

It is another advantage of the solution according to the invention that any organic components still present and the carbon monoxide are oxidized to the highest degree by the combustion which takes place subsequent to the deflagration.

It is likewise advantageous that the harmful substance reducing plant connected downstream of each combustion installation can be used in common by the deflagration installation and the combustion installation so that a separate plant for the reduction of harmful components for the deflagration reactor alone can be dispensed with.

Finally, it is of great advantage with the method according to the invention and the installation according to the invention for deflagrating explosives that due to the supply of the gas mixture carrying high thermal energy from the deflagration reactor into the furnace much less fuel is needed in the furnace, a circumstance which has a considerable effect on the economy of the combustion part of the installation as a whole or of the overall process.

For better utilization of the time, deflagration installations often comprise at least two deflagration reactors one of which, for instance, is being fed with explosives while deflagration takes place in the other one. Therefore, an advantageous further development of the method according to the invention provides for feeding the combustion chamber of the furnace with the gas mixtures of a plurality of deflagration reactors operated in parallel in respect of the conduction of the gas mixture.

As an alternative, and with the same objective of optimum exploitation of a plurality of deflagration reactors, it may preferably be provided that the gas mixture withdrawn from the deflagration reactor is supplied to another deflagration reactor, and that the further gas mixture formed in the other deflagration reactor from the gas mixture supplied to it and from the flue gases is fed into the combustion chamber of the furnace.

As it is the main function of the fresh air introduced into the deflagration reactor to cool the flue gases resulting from the deflagration, it is preferably provided in the "series connection" mentioned above of deflagration reactors with which the gas mixture issuing from one deflagration reactor is fed together with fresh air into the next successive deflagration reactor, that cooling of the gas mixture takes place between the adjacent deflagration reactors, especially by the supply of fresh air.

A further development according to which the gas mixture discharged from the combustion chamber of the furnace is supplied to an energy recuperation plant serves to further improve the energy balance of the installation according to the invention.

The exhaust gases which issue from the energy recuperation plant and are cooled due to the recuperation of energy preferably are supplied to a plant for the reduction of harmful components. This further development of the invention has the great advantage that only one common harmful substance reducing plant is needed both for the deflagration reactor and the furnace, and the afterburning stage otherwise customary for the afterburning of the non-oxidized organic components (such as carbon monoxide and nitrogen oxide shares) either can be dispensed with altogether or may be dimensioned much smaller. In any case it is of special advantage that only one common plant is required with the method of the invention to reduce the harmful substances.

Further advantageous modifications of the method according to the invention result from the fact that the gas mixtures of various stages of the method can be recycled into the process. Thus it is provided preferably that the cooling of the gas mixture between the deflagration reactors (series connection of the reactors) takes place by recycling the exhaust gas mixture discharged from the harmful substance reducing plant.

As an alternative or in addition to the above, provision may be made for the exhaust gas discharged from the energy recuperation plant or also the gas mixture discharged from the harmful substance reducing plant to be fed totally or partly to the deflagration reactor or the deflagration reactors, with the advantage of further improvement of the energy balance of the overall process being obtained. Thus the exhaust gas mixture is introduced into each deflagration reactor either instead of or in addition to the fresh air, whereby it is possible to adjust the oxygen content to a desired level in each deflagration reactor.

Two advantageous further developments of the installation according to the invention for the deflagration of explosives alternatively provide for a plurality of deflagration reactors either to be connected in parallel or in series in respect of the conduction of the exhaust gas mixture. In the case of a connection in parallel the (exhaust) gas mixtures consisting of the fresh air which was fed into each deflagration reactor for cooling and of the flue gases resulting from the deflagration of the explosives are combined and subsequently passed on to the furnace for the combustion of fuels. In the case of the series connection of the deflagration reactors, the respective gas mixture (supply air and flue gases) discharged from a deflagration reactor is fed into the next successive deflagration reactor as supply air instead of the fresh air introduced in the case of the first deflagration reactor or in addition to the same.

As regards the series connection of deflagration reactors, it is preferably provided that there is a cooling stage in the exhaust gas stream between respective adjacent reactors. According to other further developments the cooling stage advantageously may contain either a heat exchanger, especially a quencher or a suction device for fresh air. This cooling stage serves for cooling of the gas mixture to be fed into a subsequent deflagration reactor to any desired temperature, for example below 100° C.

It is provided that filters, especially particle filters are connected upstream and/or downstream of the deflagration reactor or reactors, respectively, with the advantage of a further reduction of harmful components.

In per se known manner it is further preferably provided that the exhaust gas mixture of the furnace is supplied to an energy recuperation plant, for example a power plant or the like.

A special advantage of the installation according to the invention is obtainable by a further development according to which the energy recuperation plant is followed by a harmful substance reducing plant to which the exhaust gases are fed from the energy recuperation plant. Thus the overall installation which comprises a deflagration part for burning up the explosives and a combustion part for burning fuels requires but a single plant for the reduction of harmful substances, common to both parts of the installation. And, moreover, it has a particularly advantageous effect that this harmful substance reducing plant can do entirely or partly without the otherwise required for afterburning of the non-oxidized organic components, such as carbon monoxide and nitrogen oxide shares since the afterburning essentially takes place in the combustion part of the overall installation.

As already explained above with respect to the method according to the invention, of course, it is advantageous also with the installation according to the invention if, for instance, the cooling stage arranged between respective adjacent deflagration reactors (series connection) aspires the gas mixture discharged by the harmful substance reducing plant for cooling.

BRIEF DESCRIPTION OF THE DRAWINGS

A preferred embodiment of the method according to the invention and of the installation according to the invention for the deflagration of explosives will be explained below with reference to two schematic block diagrams, in which:

FIG. 2 is a diagram similar to FIG. 1, yet illustrating a series connection of two deflagration reactors with a cooling stage connected in between.

DETAILED DESCRIPTION OF THE PREFERRED EMBODIMENT

Figure 1:
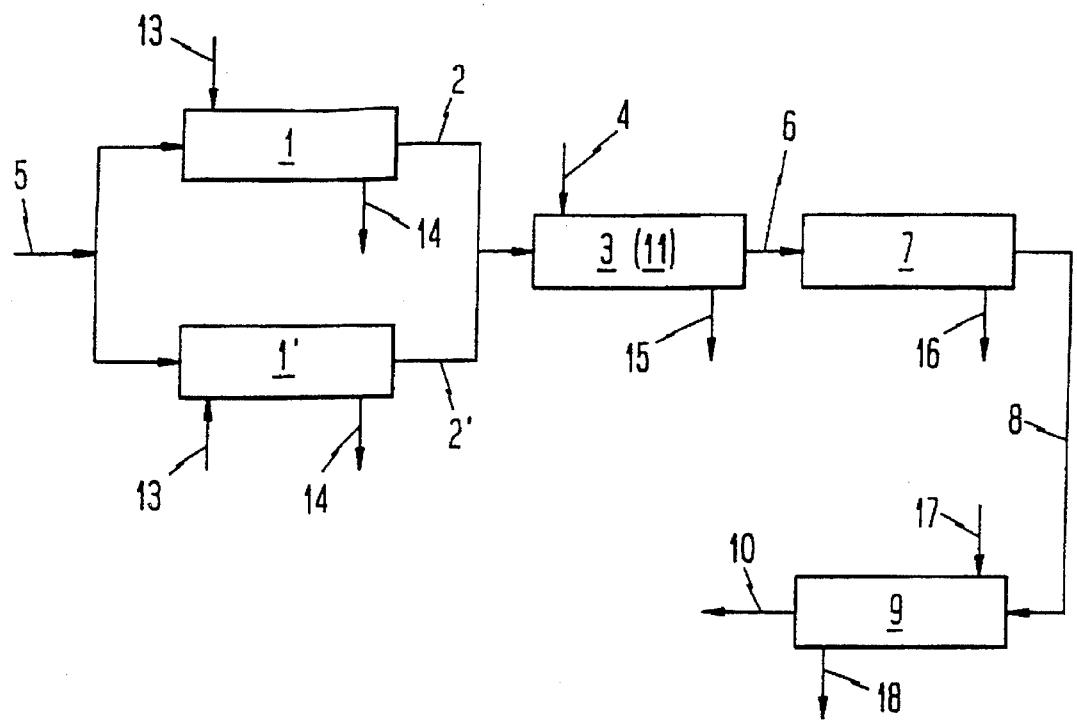
FIG. 1 is a functional diagram of a method or installation for the deflagration of explosives, comprising two deflagration reactors connected in parallel.
Figure 2:
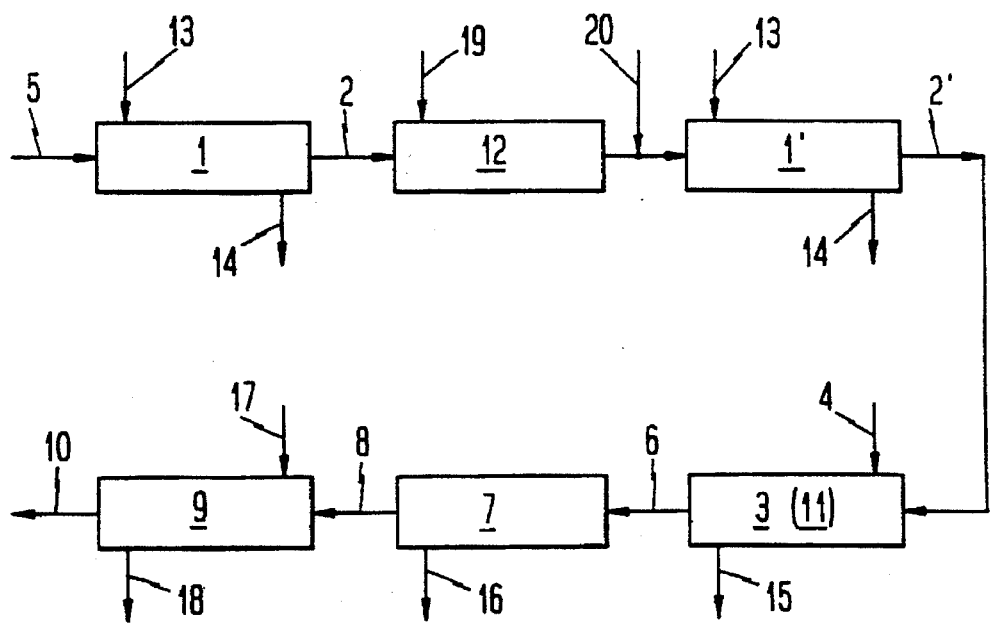

FIGS. 1 and 2 show a schematic functional diagram to illustrate the method of deflagrating explosives and, at the same time, to explain the essential component parts of an installation for the deflagration of explosives.

The functional diagram according to FIG. 1 shows two deflagration reactors 1, 1' which are operated in parallel connection and in which explosives 13 are burnt up, with fresh air or supply air 5 being introduced. The gaseous reaction products formed during the deflagration of the explosives, the flue gases, mix inside the deflagration reactors 1, 1' with the supply air or fresh air supplied (hereinafter simply called fresh air) and form the gas mixtures 2, 2' which issue from the deflagration reactors 1, 1'. Part of the reaction products from the deflagration of the explosives 13 result in the form of ash 14 which is disposed of separately.

While the flue gas formed during deflagration of the explosives 13 has a temperature of several thousand degrees, the gas mixtures 2, 2' exiting from the deflagration reactors 1, 1' are cooled to an adjustable temperature of, for example, 300° C. by mixing of the flue gases with the fresh air 5 supplied. These gas mixtures 2, 2' are supplied to the combustion chamber 3 of a furnace 11 for the combustion of fuels 4 and serve as fuel gas having an (adjustable) oxygen content of 16 to 20%, for instance.

On their way from the deflagration reactors 1, 1' the gas mixtures 2, 2' pass through particle filters not shown in the drawing but provided for the purpose of (intermediate) purification of the gas mixtures 2, 2'.

The furnace 11, for example, may be the usual heat generation in a power plant, a waste incinerating plant, or also the blast furnace part of a cement factory. What the combustion chambers 3 of all those plants have in common is that, with the addition of fuels 4, heat is generated which is supplied in a downstream energy recuperation plant 7, for example the steam generator of a power plant, as exhaust gas mixture 6 with the energy gain 16. The residues from combustion 15 formed in the combustion chamber 3 by the combustion of garbage, for example, depend in composition on the explosives 13. However, the energy 16 which may be taken from the energy recuperation plant 7 comprises the thermal energy from the explosives 13 and the fuels 4. An extremely effective improvement of the energy balance of the installation is achieved by feeding the gas mixtures 2, 2' from the deflagration reactors 1, 1' into the combustion chamber 3 of the furnace 11 since the gas mixtures 2, 2', being the fuel gas of the combustion chamber 3, already have been preheated to a temperature of for instance 300° C., with the temperature of the gas mixtures 2, 2' in principle being adjustable to any desired value by the supply of fresh air 5.

The exhaust gases 8 which exit from the energy recuperation plant 7 and are cooled are fed to a harmful substance reducing plant 9 to which a binder 17 is supplied for treatment of the harmful components contained in the exhaust gas 8. The starting products of the harmful substance reducing plant 9 are a bound, harmful substance waste 18 suitable for dumping or further processing as well as an exhaust gas mixture 10 which is discharged into the surroundings, in keeping with the 17th BImSchV, or recycled into the process to different process stages.

For example, it may be advantageous for optimizing the energy balance of the overall installation to supply the exhaust gas 8 withdrawn from the energy recuperation plant 7 or the exhaust gas mixture 10 discharged from the harmful substance reducing plant 9, totally or partly, to the deflagration reactors 1, 1' instead of the fresh air 5 or also in addition to the fresh air 5.

FIG. 2 shows a functional diagram very largely corresponding to FIG. 1, yet with the deflagration reactors 1, 1' here in FIG. 2 not being operated in parallel connection but in series connection with respect to the conduction of the respective gas mixture 2, 2'. Fresh air 5 is supplied to the first deflagration reactor 1 and it again mixes inside the deflagration reactor 1 with the hot flue gases resulting from the deflagration of the explosives 13, is strongly cooled down, and forms a gas mixture 2.

In the case of a one-stage installation, i.e. with the provision of only one deflagration reactor 1, this gas mixture 2 would be supplied directly to the combustion chamber 3 of the furnace 11.

In the instant case of a multi-stage embodiment of a method and an installation for the deflagration of explosives, the gas mixture 2 issuing from the first deflagration reactor 1 first is supplied to a cooling stage 12 which cools the gas mixture 2 from a temperature of 300° C., named in examplary fashion, to a much lower temperature of an intermediate gas mixture 21 which then is introduced into the second deflagration reactor 1'. In the second deflagration reactor 1' this intermediate gas mixture 21 serves the cooling function which the supply air or fresh air 5 fulfills in the deflagration reactor 1. Further cooling of the intermediate gas mixture 21 or, on the other hand, enrichment with oxygen can take place selectively also by further supply of fresh air 20 into the second deflagration reactor 1'.

The cooling stage 12 is embodied in examplary fashion as an injection cooler (quencher), making use of water 19.

The mode of operation of the combustion stage (combustion chamber 3) and the subsequent process stages (energy recuperation plant 7 and harmful substance reducing plant 9) is identical with the installation or method described with reference to FIG. 1.

Also with this arrangement of the deflagration reactors 1, 1', or the method connected with them, filters not shown in the drawing, especially particle filters, are connected upstream or downstream of the deflagration reactors 1, 1' in order to purify the gas mixtures 2, 2'.

The energy recuperation plant 7 can be operated with a high degree of efficiency because less loss of thermal energy occurs in the combustion chamber 3 already, as compared to known methods, due to the fuel gas which already is preheated (gas mixtures 2, 2'). However, the combination of a deflagration installation for explosives with a furnace also becomes noticeable in the reduced need for fuel 4 for the combustion due to the utilization of the hot gas mixtures 2, 2' in the combustion.

Also the energy-intensive disposal of explosives in the form of a slurry is rendered superfluous by the instant method and installation devised for deflagrating explosives. The explosives 13 can be burnt up in their pure form within the deflagration reactors 1, 1' (or also in a single deflagration reactor) so that the great amount of energy for evaporating the high proportion of water (for example 90%) of a slurry need no longer be spent. In the present case, the exhaust gas mixture 6 idealizedly contains the full thermal energy from the deflagration of the explosives 13 as well as from the combustion of the fuels 4. This thermal energy is recuperable in simple manner at a relatively high temperature level, as compared to the steam proportion of a conventionally burnt slurry.

We claim:

1. A method of deflagrating explosives, wherein the explosives are burnt up in a first deflagration reactor and the flue gases resulting during deflagration are mixed with fresh air fed into the first deflagration reactor, thereby being cooled, to produce a first gas mixture, said first gas mixture then being discharged from the first deflagration reactor, wherein the improvement comprises supplying the first gas mixture (2) discharged from the first deflagration reactor (1) to the combustion chamber (3) of a furnace (11) for the combustion of fuels (4).

2. The method according to claim 1, wherein the first gas mixture (2) from the first deflagration reactor (1) and a second gas mixture (2') produced by mixing flue gases from a second deflagration reactor (1') with fresh air are supplied to the combustion chamber (3).

3. The method according to claim 1, wherein the first gas mixture (2) discharged from the first deflagration reactor (1) is supplied to a second deflagration reactor (1'), and wherein a second gas mixture (2') resulting from the mixture of the first gas mixture (2) with flue gases from the second deflagration reactor (1') is fed into the combustion chamber (3).

4. The method according to claim 3, wherein cooling of the first gas mixture (2) takes place between adjacent first and second deflagration reactors (1; 1').

5. The method according to claim 4, wherein the cooling takes place by supply of fresh air (5).

6. The method according to claim 1 further comprising supplying an exhaust gas mixture (6) withdrawn from the combustion chamber (3) of the furnace to an energy recuperation plant (7).

7. The method according to claim 6, further comprising supplying exhaust gases (8) issuing from the energy recuperation plant (7) to a harmful substance reducing plant (9).

8. The method according to claim 7, wherein the first gas mixture (2) discharged from the first deflagration reactor (1) is supplied to a second deflagration reactor (1') wherein a second gas mixture (2') resulting from the mixture of the first gas mixture (2) with flue gases from the second deflagration reactor (1') is fed into the combustion chamber, and wherein the first gas mixture (2) between the first and second deflagration reactors (1; 1') is cooled by using an exhaust gas mixture (10) discharged from the harmful substance reducing plant (9).

9. The method according to claim 6 further comprising supplying exhaust gas (8) discharged from the energy recuperation plant (7) entirely or partly to the first deflagration reactor.

10. The method according to claim 7 further comprising supplying an exhaust gas mixture (10) discharged from the harmful substance reducing plant (9) entirely or partly to the first deflagration reactor.

11. An installation for the deflagration of explosives, comprising a deflagration reactor in which the explosives are burnt up, the flue gases resulting during deflagration being mixed with fresh air fed into the deflagration reactor, thereby being cooled, and then being discharged from the deflagration reactor through exhaust gas pipes, wherein the improvement comprises connecting the deflagration reactor (1) by its exhaust gas pipes to a furnace (11) for the combustion of fuels (4).

12. The installation according to claim 11, further comprising first and second deflagration reactors (1; 1') connected in parallel in respect of the conduction of the exhaust gas mixture.

13. The installation according to claim 11, further comprising first and second deflagration reactors (1; 1') connected in series in respect of the conduction of the exhaust gas mixture.

14. The installation according to claim 13, further comprising a cooling stage (12) disposed in the exhaust gas stream between respective adjacent first and second reactors (1: 1').

15. The installation according to claim 14, wherein the cooling stage (12) comprises a heat exchanger.

16. The installation according to claim 14, wherein the cooling stage (12) comprises a suction device for fresh air (5).

17. The installation according to claim 12 further comprising filters connected upstream and/or downstream of the first and second deflagration reactor(s) (1; 1').

18. The installation according to claim 11 further comprising an energy recuperation plant (7) fed with an exhaust gas mixture (6) from the furnace (11).

19. The installation according to claim 18 further comprising a harmful substance reducing plant (9) which is fed with the exhaust gases (8) from the energy recuperation plant (7).

* * * * *